Oct. 27, 1959     C. T. McGRAW ET AL     2,909,794
HOSE WASHER
Filed May 28, 1956     3 Sheets-Sheet 3
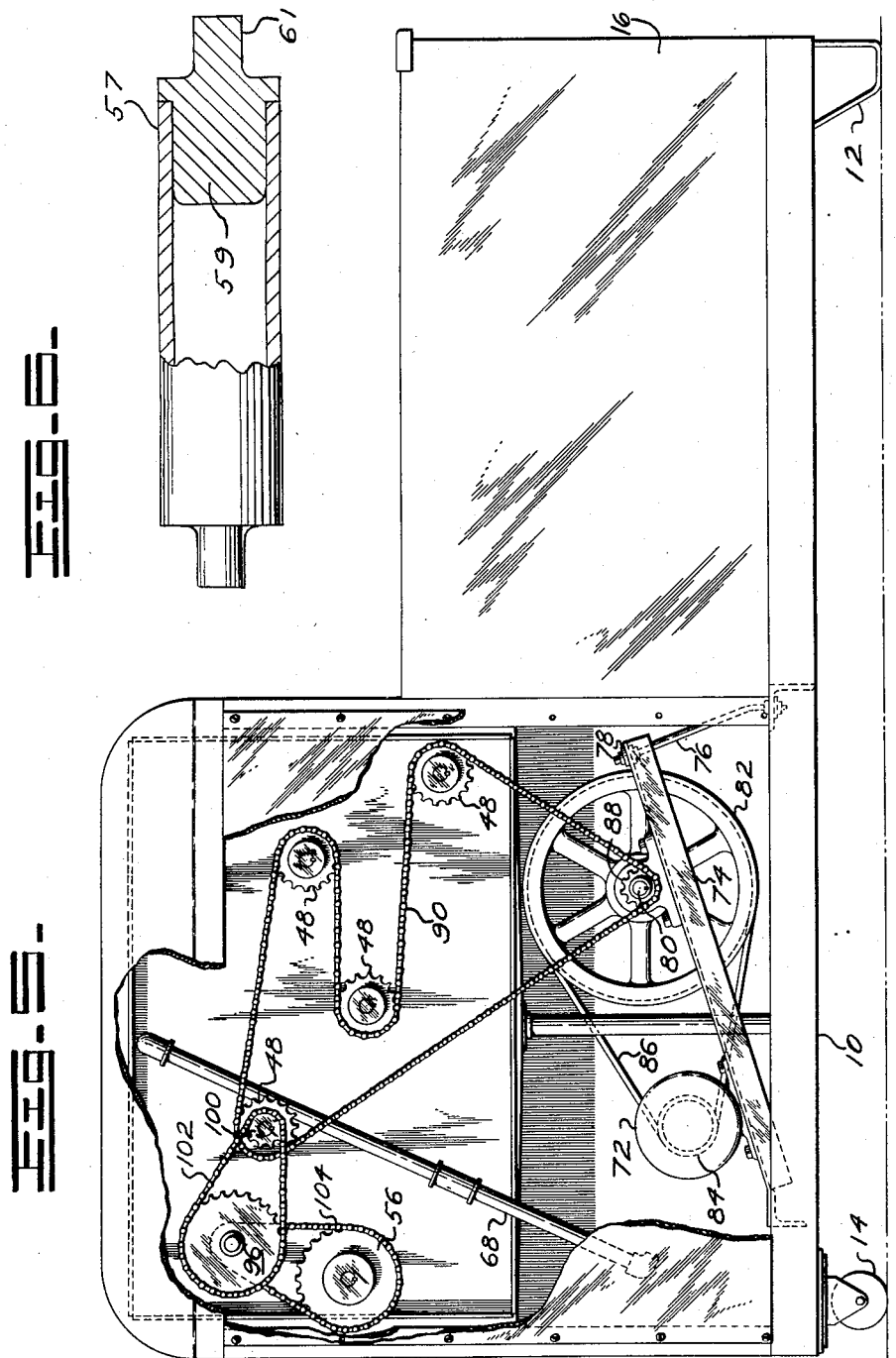
INVENTOR
Clarence T. McGraw
William H. Cain
BY
Lownen P. Beaman
ATTORNEY

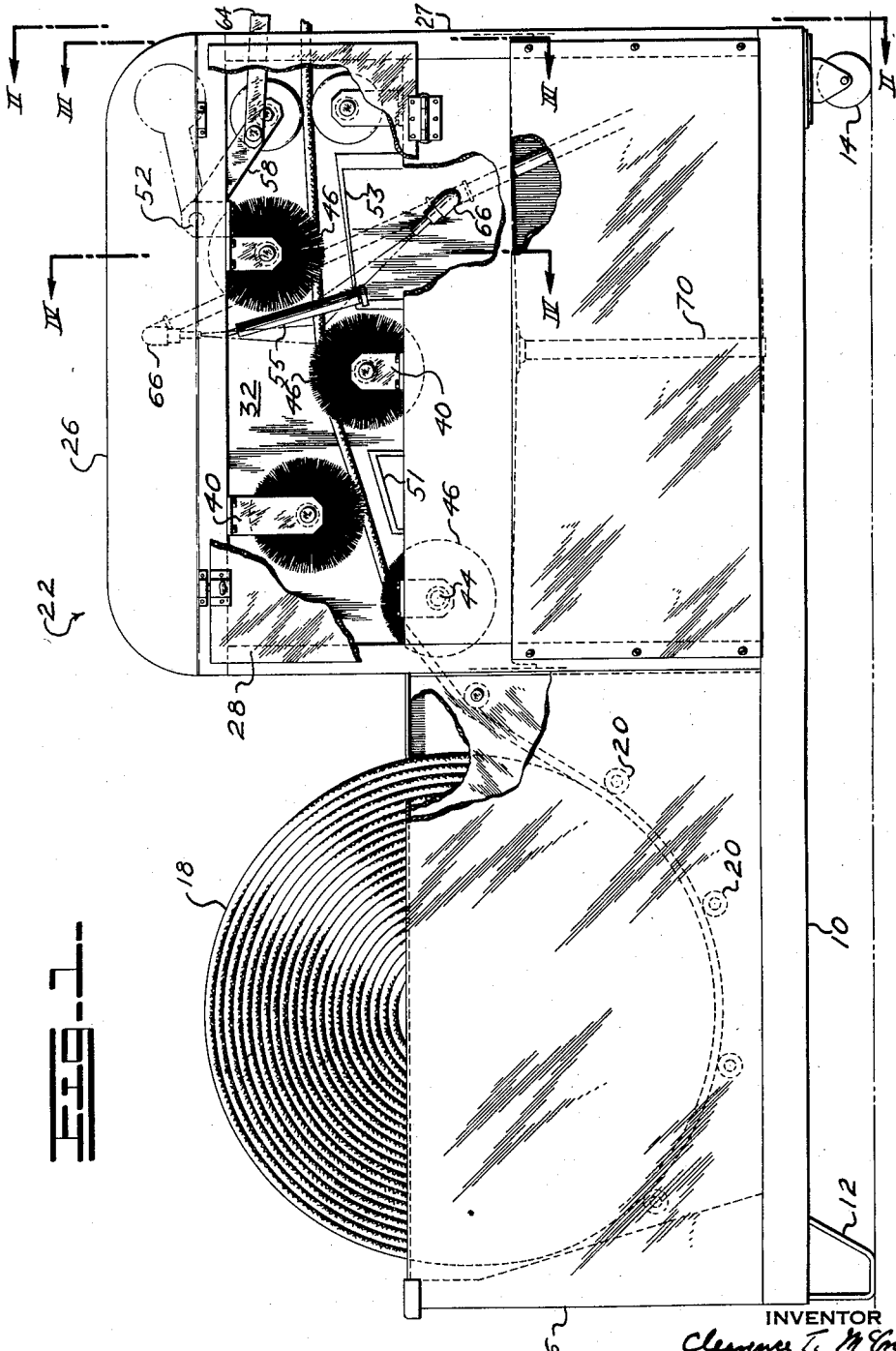

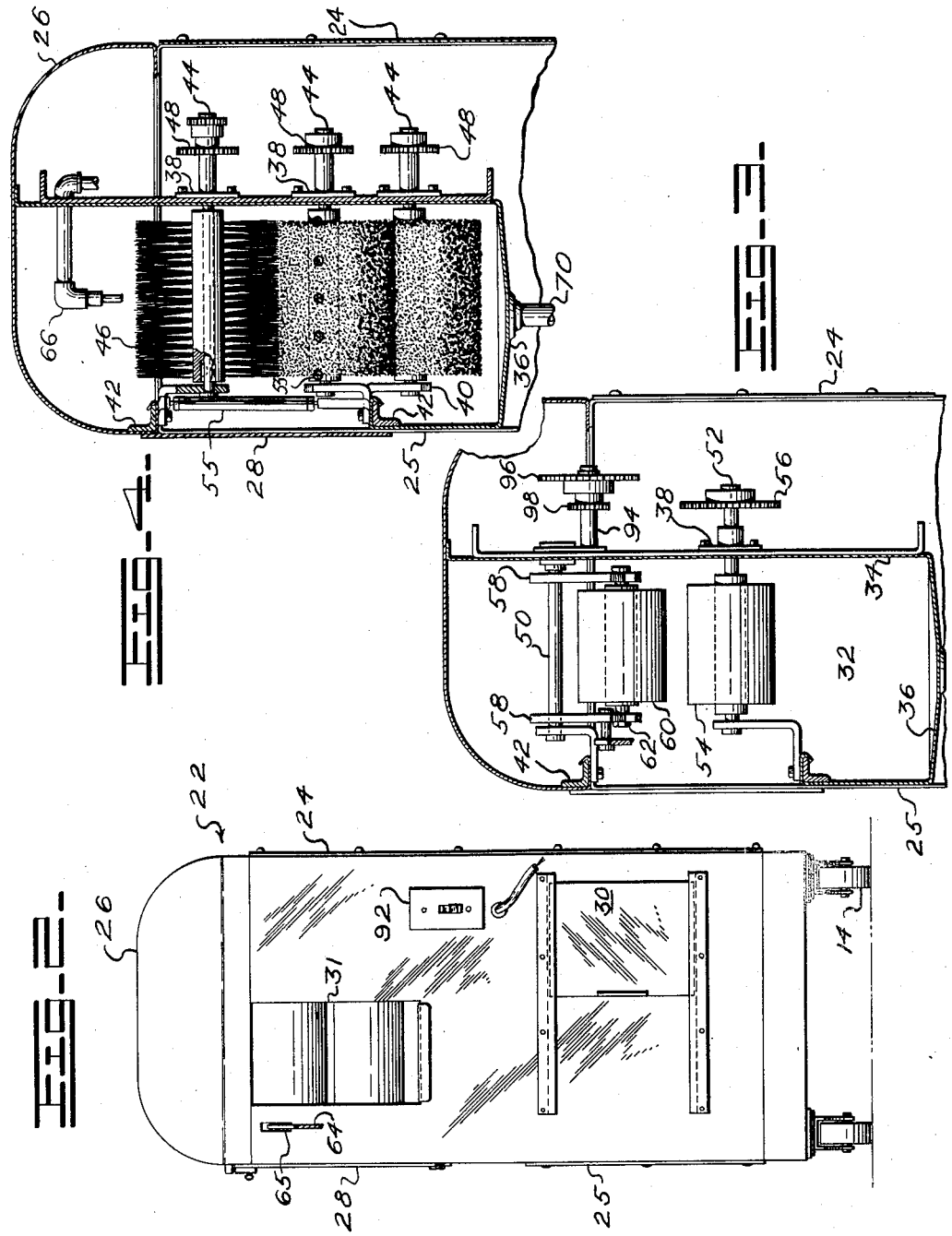

United States Patent Office 2,909,794
Patented Oct. 27, 1959

2,909,794

HOSE WASHER

Clarence T. McGraw, Grosse Pointe Park, and William J. Cain, Spring Arbor, Mich., assignors to The Circul-Air Corporation, Detroit, Mich.

Application May 28, 1956, Serial No. 587,517

2 Claims. (Cl. 15—40)

The invention relates to hose washing machines and particularly to washing of fire hose.

In the use of canvas fire hose the hose usually becomes muddy and dirty from dragging the hose over the ground and permitting it to lie in dirty water when in use. Such hose must be cleaned and dried before being stored to prevent mildew and to prolong the life of the hose. According to the present invention an improved machine for cleaning the hose preparatory to the drying and storing of the same has been provided.

An object of this invention is to produce a hose cleaning machine which includes a soaking or immersion tank as a part of the integral unit.

Another object is to produce a hose cleaning machine in which the hose is soaked, brushed, sprayed and squeezed during the cleaning action.

A further object of the invention is to produce a hose cleaning machine which eliminates the necessity of hanging the hose to drain before drying.

Another object of the invention is to design a hose cleaning machine in which the hose is self-propelled through the machine at a uniform rate.

Yet another object of the invention is to produce a hose cleaning machine which may be operated by one man and is readily portable.

These and other objects of the invention will become apparent from the appending specification and claims and drawings wherein:

Fig. 1 is a side-elevational view, with a portion of the outer casing of the machine shown broken away, Fig. 2 is an end elevational view of Fig. 1 taken of the discharge end of the machine.

Fig. 3 is a cross-sectional view taken on line III—III of Fig. 1,

Fig. 4 is a cross-sectional view taken on line IV—IV of Fig. 1,

Fig. 5 is a view similar to Fig. 1 taken from the opposite side, and

Fig. 6 is a fragmentary detail view of the hose guide.

In the disclosed embodiment, the hose cleaning machine comprises a base 10 which is supported by brackets 12 at one end and wheels or rollers 14 at the opposite end, thereby permitting the entire machine to be easily transported when the bracket end is raised off the floor.

Mounted on approximately one-half of the base 10 is a tank 16, the top of which is open to permit a coil of hose 18 to be lowered therein. Rotatably mounted within tank 16 are a series of rollers 20 which are arranged in an arcuate pattern to rotatably support the coil of hose. During operation of the machine the tank 16 is substantially filled with water or other cleaning fluid to allow the hose to soak and thereby facilitate removal of the dirt.

A housing 22 is mounted on the remainder of base 10 to enclose the washing area. Housing 22 consists of vertical walls 24 and 25, a top 26 and end wall 27. Doors 28 and 30 are formed in the housing 22 to provide access to the interior and opening 31 is the discharge port of the cleaned hose. Wall 24 may be removed to give access into the rear of the housing.

A washing compartment 32 is defined in the housing 22 by walls 25 and 27, door 28, top 26, an inner wall 34 and chain trough 36.

Mounted to the inner wall 34 are a series of bearing brackets 38 and a complementary set of bearing brackets 40 are supported within the washing compartment 32 by suitable frame members 42. Rotatably mounted within the two sets of bearings are a series of shafts 44 on which are keyed rotary brushes 46. Chain sprockets 48 are attached to the ends of shafts 44 to impart the driving motion thereto.

As viewed in Fig. 1 the bearing brackets on the far right support shafts 50 and 52. A wringer roller 54 is keyed to shaft 52 and is driven through sprocket 56.

Pivotally mounted to shaft 50 are two levers 58 which rotatably support a wringer roller 60 in shaft 62. A hand lever 64 is pivotally fixed to one of the levers 58 and extends through a reinforced opening 65 of housing 22. The lever 64 bears against the edge of opening 65 which acts as a fulcrum, therefore as the outer end of the lever is raised the roller 60 is lowered and by lowering lever 58 the roller 60 will move upwardly away from lower roller 54. It is thus observed that the distance between wringer rollers 54 and 60 may be manually varied by means of lever 64.

Several guiding devices are used to help thread the washer and maintain the hose in proper alignment. A series of wire rods 51 and 53 are supported beneath the upper brush and will support the end of the hose as the machine is threaded and the end passes over the lower brushes. A roller 55 is also used to prevent the hose from excessive transverse movement and consists of a tubular sleeve 57 (Fig. 6) into which are inserted plugs 59 formed with cylindrical journals 61 which are supported in suitable bearing brackets.

To provide a most effective cleaning action a set of nozzles 66 are mounted in the washing compartment 32 and are positioned so as to direct a stream of water or other cleaning fluid onto the hose as it passes through the brushes. The nozzles are connected to a pipe 68 which may be attached to a water supply through door 30. A drain pipe 70 is secured to the drain trough 36 to carry away the used cleaning liquid from the washing compartment 32.

A drive motor 72 is mounted within the housing and beneath the washing compartment 32. Motor 72 is attached to a base 74 which may be pivoted about its lower end, the height of base 74 being adjusted by threaded rod 76 and lock nuts 78. A jack shaft 80 is also mounted in suitable bearing on base 74, on one end of the jack shaft 80 is keyed a sheave 82 which is driven from the motor pulley 84 by belt 86. Sprocket 88 is keyed to the other end of shaft 80.

Sprocket 88 is connected to sprockets 48 by means of chain 90 thereby rotating brushes 46 when motor 72 is energized by switch 92.

A jack shaft 94 is mounted adjacent the wash compartment 32 and supports sprockets 96 and 98. A sprocket 100 is mounted on one of the shafts 44 and chain 102 connects sprockets 96 and 100 while chain 104 transmits motion from sprocket 98 to sprocket 56 thereby driving wringer roller 54. From the difference in the sprocket sizes it will be observed that the brushes will rotate much faster than roller 54. Chain 90 may be kept at the proper tension by raising or lowering base 74 through adjustment of nuts 78.

The operation is as follows:

The machine should be placed over a drain such that water flowing from drain pipe 70 may be removed. A water supply is attached to pipe 68 and tank 16 is about half filled with water. The coil of hose 18 is lowered into tank 16 and rests upon rollers 20. The hose is threaded through the machine as shown in Fig. 1 such that two brushes 46 contact the lower side of the hose and two brushes clean the upper hose portion. Roller 60 is raised to allow the hose coupling to pass through and the end of the hose extends through opening 31. The door 28 is closed and the water supply is turned on to cause the nozzles 66 to spray water on the hose. Switch 92 is closed to energize motor 72 thereby starting the brushes to rotate and also rotating wringer roller 54. When hand lever 64 is raised the hose will be compressed between rollers 54 and 60 thereby pulling the hose through the machine. The hose is brushed twice on both sides by brushes 46, which are of the soft bristle type such that the hose will be encompassed by a good portion of the brush and the edge of the hose will be cleaned. Water emitting from nozzles 66 aids in the cleaning action and rinses the dirt off the hose, rollers 54 and 60 squeeze out the excess water as well as propel the hose. As the hose is fed from the machine a suitable table or receptacle may be used to receive the same.

The wringing action of rollers 54 and 60 is sufficient to permit the hose to be placed immediately into the drying cabinet without additional drying processes.

If desired soaps or detergents may be added to the cleaning water in the tank 16, and any desired cleaning fluid may be utilized with the machine, water has been used in the specification for illustrative purposes only.

It is thus seen that we have produced a portable hose washing machine of a compact size which may be operated by an unskilled operator and is economical to manufacture. The hose is washed in a continuous process producing a uniformly cleaned product which is ready for drying and storage.

We claim:

1. A hose washing machine comprising in combination, a portable base, a soaking tank mounted upon said base adapted to receive a coil of hose therein, an enclosed housing mounted on said base having a washing compartment therein, a plurality of rotatable brushes within said compartment, inlet and outlet openings defined in said compartment whereby the hose may be fed from said tank through said compartment, a lower wringer and feed roller journaled in said compartment adjacent said outlet opening, an upper wringer and feed roller rotatably supported on a pair of spaced levers pivotally mounted within said compartment and adapted to be moved toward and from said lower roller in an arcuate path, a fulcrumed manual hand lever pivotally affixed to one of said spaced levers for moving said upper roller toward said lower roller upon operation of said hand lever to feed said hose in contact with said brushes, nozzle means within said compartment directing cleaning fluid upon the hose therein and a motor mounted on said base in rotary driving relation with said brushes and said lower roller.

2. In a hose washing machine as in claim 1 wherein said hand lever is pivotally affixed to said spaced lever adjacent the axis of said upper roller and the fulcrum of said hand lever comprises an opening defined in said compartment through which said hand lever projects.

References Cited in the file of this patent

UNITED STATES PATENTS

| | | |
|---|---|---|
| 590,836 | Hayes | Sept. 28, 1897 |
| 663,282 | Kress | Dec. 4, 1900 |
| 831,294 | Olson | Sept. 16, 1906 |
| 2,282,628 | Whann | May 12, 1942 |
| 2,784,432 | Whaley | Mar. 12, 1957 |

FOREIGN PATENTS

| | | |
|---|---|---|
| 11,917 | Great Britain | of 1913 |
| 887,453 | Germany | Aug. 24, 1953 |